United States Patent [19]
Hickey

[11] Patent Number: 5,922,779
[45] Date of Patent: Jul. 13, 1999

[54] POLYOL BLENDS FOR PRODUCING HYDROCARBON-BLOWN POLYURETHANE AND POLYISOCYANURATE FOAMS

[75] Inventor: F. Leo Hickey, Arlington Heights, Ill.

[73] Assignee: Stepan Company, Northfield, Ill.

[21] Appl. No.: 08/949,239

[22] Filed: Oct. 10, 1997

[51] Int. Cl.$^6$ .................................................. C08G 18/42
[52] U.S. Cl. ...................... 521/114; 521/131; 521/172; 252/182.24
[58] Field of Search ................... 252/182.24; 521/131, 521/172, 114

[56] References Cited

U.S. PATENT DOCUMENTS

| | | | |
|---|---|---|---|
| 1,922,459 | 8/1933 | Schmidt et al. | |
| 3,647,759 | 3/1972 | Walker. | |
| 4,411,949 | 10/1983 | Snider et al. | 156/78 |
| 4,595,711 | 6/1986 | Wood | 521/158 |
| 4,644,027 | 2/1987 | Magnus et al. | 524/375 |
| 4,644,048 | 2/1987 | Magnus et al. | 528/176 |
| 4,714,717 | 12/1987 | Tondrigan et al. | 521/131 |
| 4,897,429 | 1/1990 | Trowell et al. | 521/157 |
| 5,182,309 | 1/1993 | Hützen | 521/99 |
| 5,464,562 | 11/1995 | Patterson | 521/116 |
| 5,470,501 | 11/1995 | Fishback et al. | 521/115 |
| 5,484,817 | 1/1996 | Patterson | 521/116 |
| 5,488,071 | 1/1996 | Patterson | 521/114 |
| 5,504,125 | 4/1996 | Fishback et al. | 521/115 |
| 5,523,332 | 6/1996 | Fishback et al. | 521/115 |

FOREIGN PATENT DOCUMENTS

| | | |
|---|---|---|
| 196 39 334 | 4/1998 | Germany. |
| WO 94/01479 | 1/1994 | WIPO. |
| WO 96/12759 | 5/1996 | WIPO. |

OTHER PUBLICATIONS

Polyethers, Part I: Polyalkylene Oxides and Other Polyethers, N.G. Gaylord, ed, Interscience, 1963, pp. 233–237.

Nicola, et al., "Hydrocarbon Blown Foams for U.S. Construction Applications", 35th Annual Polyurethane Technical/Marketing Conference, Oct. 9–12, 1994, pp. 412–417.

van der Wouden, et al., "The Use of Polyester Polyols in CFC–free Rigid Forms", *Utech '94*, Paper 21, pp. 1–5. 1994.

van der Wouden, "Performance of Oleochemical Based Polyester Polyols in Polyurethanes", *Utech Asia '95*, Paper 34, pp. 1–7. 1995.

Nicola, et al., "Improved Hydrocarbon Blown Foams for North America", *Polyurethane*, 1995, pp. 156–162.

Matsumoto, et al., "Development of Cyclopentane Blown Foam System for Appliances Use", *Polyurethane*, 1995, pp. 292–295.

Burkhart, et al., "Optimized Silicone Surfactants for HCFC and Pentane Blown Polyisocyanurate and Polyurethane Rigid Foams", *Polyurethane*, 1995, pp. 296–302.

Hanne, et al., "Patented, Pentane–Process Technology Key to U.S. CycloPentane–Blown Refrigerator Production", *Polyurethane*, 1995, pp. 481–483.

Chittolini, "Increasing the Solubility of Pentane in Rigid Foam Systems", *Utech '96*, Paper 56, pp. 1–6. 1996.

Ballhaus, et al., "Hydrocarbons Provide Zero ODP and Zero GWP Insulation for Household Refrigeration", *Proceedings of the Polyurethanes World Congress*, 1993, pp. 33–39.

Encyclopedia of Chemical Technology, vol. 7, pp. 257–263 published by Interscience Publishers, Inc., 1951.

*Primary Examiner*—Rachel Gorr
*Attorney, Agent, or Firm*—McDonnell Boehnen Hulbert & Berghoff

[57] ABSTRACT

Disclosed are aromatic polyester polyols, polyester polyol resin blends, methods for preparing such compositions and polyurethane and polyisocyanurate foams made using the compositions, wherein the resin blends generally comprise:

(a) an aromatic polyester polyol formed by a reaction between a phthalic acid based material; a hydroxylated material having a functionality of at least 2; and a hydrophobic material;

(b) a nonionic surfactant; and (c) a $C_4$–$C_7$ hydrocarbon blowing agent.

14 Claims, No Drawings

POLYOL BLENDS FOR PRODUCING HYDROCARBON-BLOWN POLYURETHANE AND POLYISOCYANURATE FOAMS

BACKGROUND OF THE INVENTION

1. Field of the Invention

The present invention relates to rigid, closed-cell polyisocyanate-based foams and to polyol resin blends used to make such foams. In particular, the invention relates to polyol resin blends containing a modified polyester polyol, a nonionic surfactant, and a hydrocarbon blowing agent.

2. Description of the Related Art

A common process for producing polyurethane and polyisocyanurate foams requires preparing a "resin" or "B component" and subsequently mixing the resin with an isocyanate immediately prior to discharge of the final foam-generating mixture. This resin typically contains a polyol or a mixture of polyols; catalysts; silicone or other cell-stabilizing surfactants; and one or more blowing agents which vaporize due to the heat of reaction resulting in expansion of the foam. It may also contain water, as an additional blowing agent which functions by chemical generation of carbon dioxide during the reaction with isocyanate; flame retardants; and other additives.

In such a process phase stability, or resistance to separation into layers of different composition, is an important property of the resin blend. Often the resin is packaged for later sale or use, rather than being used immediately. Even if the resin is blended only by the end user, some time may elapse before it is completely consumed in the course of normal production; this elapsed time may amount to as much as several days. In either case, if separation of ingredients into discrete layers occurs, the resin will not perform correctly in use.

An additional desirable property of the resin is a viscosity that is sufficiently low to allow ease of pumping and mixing. A high resin viscosity can cause difficulties in transfer of the material, for example from storage to foam machine or from the machine holding tank to the mixing head. Excessive viscosity can also be a serious obstacle to efficient mixing with the isocyanate in the mixing head. For instance, in high-pressure impingement mixing, the efficiency of mixing may decline when the viscosity of the resin is greater than about 1000 to 2000 centipoise at the temperature of use; a viscosity of less than 1000 centipoise is to be preferred.

In an alternative process for producing polyurethane and polyisocyanurate foams, all ingredients of the resin except the blowing agent which vaporizes by heat of reaction are combined into one pre-blend. The blowing agent is then either added to the pre-blend and mixed as the combination is transferred to the final mixing head, as by the use of an inline mixer, or the blowing agent is added at the final mixing head itself. The isocyanate, or a mixture of isocyanate and blowing agent, and optionally other ingredients, are simultaneously transferred to the mixing head, where they are mixed with the resin and blowing agent and discharged to produce the polyurethane or polyisocyanurate foam. In this process, although phase stability of more than a few seconds is not necessary, it is still desirable for the pre-blend to have the property of mixing easily and uniformly with the blowing agent, and for the resulting resin blend to have a viscosity of less than 1000 centipoise to facilitate mixing with the isocyanate.

Volatile hydrocarbons such as pentane and cyclopentane are considered viable alternative blowing agents for rigid foams, but when used with existing polyols they generally result in poor phase stability and high resin viscosity. Inadequate phase stability may be addressed by introducing the blowing agent in a separate stream at or near the mix head, or by constant agitation of the pre-mixed resin in a holding tank, as described in "Hydrocarbons Provide Zero ODP and Zero GWP Insulation for Household Refrigeration" by H. Ballhaus and H. Hahn, in *Proceedings of the Polyurethanes World Congress* 1993, pages 33–39. However, these approaches are not useful for producing a phase-stable resin for later use, and also do not solve the problem of agitation and pumping difficulties associated with high viscosity.

U.S. Pat. No. 5,464,562 and U.S. Pat. No. 5,470,501 describe the use of certain polyoxyalkylene surfactants in combination with polyester polyols and hydrocarbon blowing agents, with improved phase stability. The stability described therein is of limited duration, however, consisting of up to 3 hours with normal pentane and 4 days with cyclopentane. In addition, these disclosures are silent with respect to undesirable high resin viscosity.

SUMMARY OF THE INVENTION

In a first aspect, the invention provides resins that have increased phase stability and lower viscosity. In this aspect, the invention employs polyoxyalkylene surfactants in combination with certain polyester polyols and hydrocarbon blowing agents.

Thus, there is now provided a polyester polyol resin blend comprising
(a) an aromatic polyester polyol formed by an inter-esterification reaction between
  (i) a phthalic acid based material;
  (ii) a hydroxylated material having a functionality of at least 2;
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and
    (3) an average molecular weight of from about 100 to 1000;
(b) a nonionic surfactant; and
(c) a $C_4$–$C_7$ hydrocarbon blowing agent.

In a second aspect, the polyol resin blend comprises a polyoxyalkylene nonionic surfactant together with the components (a) and (c).

In another aspect of the invention, there is provided an aromatic polyester polyol ("polyester polyol or aromatic polyol") formed by an inter-esterification reaction between
(i) a phthalic acid based material;
(ii) a hydroxylated material having a functionality of at least 2; and
(iii) a hydrophobic material having:
  (1) from one to six radicals, the radicals being selected from the group consisting of carboxylic acid groups, carboxylic acid ester groups, hydroxyl groups, and mixtures thereof;
  (2) hydrocarbon groups totaling at least 4 carbon atoms for each radical present; and
  (3) an average molecular weight of from about 100 to 1000.

In another aspect, the invention provides polyurethane or polyisocyanurate foams formed by the reaction of a polyisocyanate with a polyol resin blend containing (a) an aromatic polyester polyol formed by an inter-esterification reaction between
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof; and
    (2) hydrocarbon groups totaling at least 4 carbon atoms for each radical present; and
    (3) an average molecular weight of from about 100 to 1000; and
(b) a nonionic surfactant; and
(c) a $C_4$–$C_7$ hydrocarbon blowing agent;
wherein the nonionic surfactant is preferably a polyoxyalkylene nonionic surfactant.

Still another aspect of the invention provides polyol resin blends containing
(a) an aromatic polyester polyol formed by a reaction between
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and
    (3) an average molecular weight of from about 100 to 1000; and
(b) a $C_4$–$C_7$ hydrocarbon blowing agent.

It has been found that the combinations described herein made with both nonionic surfactant and hydrophobic material are surprisingly more effective than those manufactured with nonionic surfactant alone in providing stability to the mixture and in lowering its viscosity.

The polyol resin blends detailed herein are used to make rigid closed cell polyisocyanate-based foams which are dimensionally stable, have good insulation values and excellent flame retardance. Further, in accordance with the present invention, it is not necessary to pre-blend the blowing agent in the aromatic polyester polyol prior to feeding the resin blend to the mixing head.

There is also provided a method for making a rigid closed cell polyisocyanate based foam, by reacting an organic aromatic polyisocyanate and a polyol in the presence of a nonionic surfactant and a $C_4$–$C_7$ aliphatic or cycloaliphatic hydrocarbon blowing agent, where the polyol comprises an aromatic polyester polyol formed by an inter-esterification reaction between (i) a phthalic acid based material; (ii) a hydroxylated material having a functionality of at least 2; and (iii) a hydrophobic material having: (1) from one to six radicals, the radicals being selected from the group consisting of carboxylic acid groups, carboxylic acid ester groups, hydroxyl groups, and mixtures thereof; and (2) hydrocarbon groups totaling at least 4 carbon atoms for each radical present; and (3) an average molecular weight of from about 100 to 1000.

The hydrocarbon blowing agent may be blended with the aromatic polyol before reacting the aromatic polyol with the polyisocyanate, or the polyisocyanate may be reacted with the polyol in the presence of the hydrocarbon blowing agent without first forming a resin blend.

DETAILED DESCRIPTION OF THE INVENTION

By functionality as used herein is meant the number of reactive groups, e.g., hydroxyl groups, in a chemical molecule.

Polyester Polyol

A key aspect of the present invention is the inter-esterification of a three component system comprising a phthalic acid based material, a hydroxylated material and a hydrophobic material to produce a polyester polyol. By inter-esterification it is meant that the phthalic acid based material is esterified by the hydroxylated material and/or the hydrophobic material to produce an inter-esterification product. This inter-esterification product contains one or more phthalic acid moieties, randomly interspersed between the hydroxylated material and/or the hydrophobic material. The inter-esterification reaction is typically conducted at a temperature of about 180° C. to about 220° C., although other temperatures may be utilized which effectuate the desired inter-esterification reaction. As the first ingredient in the final polyol resin blend, there is provided a polyester polyol formed by an inter-esterification reaction between
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and
    (3) an average molecular weight of from about 100 to 1000.

The term "polyester polyol" as used herein means a polyol having ester linkages. A polyester polyol according to the invention includes any minor amounts of unreacted hydroxylated material remaining after the preparation of the polyester polyol and/or unesterified low molecular weight polyols (e.g., glycol) added after the preparation of the polyester polyol. The polyester polyol can include up to about 40 weight percent free glycol and glycol-type materials, based on the total weight of the polyester polyol.

Generally, the amount of the aromatic polyester polyol, based on the combined weight of polyester polyol and nonionic surfactant, is from about 70–99% by weight, more preferably from about 80–99% by weight, and most preferably 85–99% by weight.

In a preferred embodiment of the present invention, the combined amount of the polyester polyol and the nonionic surfactant, based on the total combined weight of the polyester polyol, nonionic surfactant and blowing agent, is from about 65–99% by weight; and the hydroxylated material is selected from the group consisting of ethylene glycol, propylene glycol, dipropylene glycol, trimethylene glycol, butylene glycols, 1,2-cyclohexanediol, poly(oxyalkylene) polyols derived by the condensation of ethylene oxide, propylene oxide, or any combination thereof, glycerol, 1,1,1-trimethylolpropane, 1,1,1-trimethylolethane, 2,2-dimethyl-1,3-propane diol, pentaerythritol, and mixtures thereof. In a preferred embodiment, the hydrophobic material is selected from the group consisting of castor oil, coconut oil, corn oil, cottonseed oil, linseed oil, olive oil, palm oil, palm kernel oil, peanut oil, soybean oil, sunflower oil, tall oil, tallow, and mixtures thereof.

In other preferred embodiments, the phthalic acid based material is phthalic anhydride and the hydroxylated material is diethylene glycol or triethylene glycol.

The polyester polyols advantageously have an average functionality of about 1.5 to 8.0, preferably about 1.6 to 6.0, and more preferably about 1.8 to 4.0. Their average hydroxyl number values generally fall within a range of about 100 to 600, preferably about 100 to 400, and more preferably about 150 to 350 (taking into account the free glycols that may be present), and their free glycol content generally is from about 1 to 30 weight percent, and usually from 2 to 20 weight percent, of the total polyester polyol.

A. Phthalic Acid Based Material

By phthalic acid based material as used herein is meant phthalic acid or a derivative of phthalic acid. Examples of phthalic acid based materials include, e.g., various phthalic acids such as terephthalic acid and isophthalic acid, phthalic anhydride, dimethyl terephthalate, polyethylene terephthalate, and trimellitic anhydride.

The phthalic acid based materials for use in preparing the polyester polyols can be (a) substantially pure phthalic acid or phthalic acid derivatives, such as phthalic anhydride, terephthalic acid, dimethyl terephthalate, isophthalic acid, and trimellitic anhydride; or (b) somewhat complex mixtures such as side stream, waste or scrap products containing residues of phthalic acid. In this context, "residues of phthalic acid" means any reacted or unreacted phthalic acid remaining in a product after its manufacture by a process in which phthalic acid or a derivative thereof is a starting component. These somewhat complex mixtures are generally available from the manufacture of phthalic acid, terephthalic acid, dimethyl terephthalate, polyethylene terephthalate, and the like. Suitable mixtures containing residues of phthalic acid for use in the invention include (a) ester-containing byproducts from the manufacture of dimethyl terephthalate, (b) scrap polyalkylene terephthalates, (c) residues from the manufacture of phthalic acid or phthalic anhydride, (d) residues from the manufacture of terephthalic acid, and (e) combinations thereof. These pure materials and mixtures are conveniently converted to a polyester polyol by reaction with hydroxylated materials as described herein. Alternatively, they may be converted to polyester polyols by reaction with intermediate polyols of the phthalic acid based material/hydroxylated material reaction product type through conventional transesterification or esterification procedures.

Polyester polyols whose acid component advantageously comprises at least about 20 percent by weight of phthalic acid residues are useful. In a preferred embodiment, the phthalic acid material in the polyester polyol is from about 20–55% by weight, based on the total weight of the polyester polyol. In a somewhat more preferred embodiment, the phthalic acid material in the polyester polyol is from about 25–50% by weight, based on the total weight of the polyester polyol.

By phthalic acid moiety is meant the following:

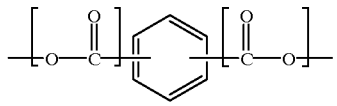

A preferred phthalic acid based material for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalate, especially polyethylene terephthalate (PET) residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate®101. DMT process residues having a different composition but still containing the aromatic esters and acids are also sold by DuPont and others. The DMT process residues to be transesterified in accordance with the present invention preferably have a functionality of at least 2. Such suitable residues include those disclosed in U.S. Pat. Nos. 3,647,759; 4,411,949; 4,714,717; and 4,897,429.

B. Hydroxylated Material

The hydroxylated material may be an aliphatic diol of generic formula (1):

where $R^1$ is a divalent radical selected from the group consisting of
(a) alkylene radicals each containing from 2 through 6 carbon atoms, and
(b) radicals of the formula (2):

where $R^2$ is an alkylene radical containing from 2 through 3 carbon atoms, and n is an integer of from 1 through 3, and
(c) mixtures thereof.

Examples of suitable aliphatic diols of formula (1) include ethylene glycol, propylene glycol, dipropylene glycol, trimethylene glycol, butylene glycols, 1,2-cyclohexanediol, poly (oxyalkylene) polyols each containing from two to four alkylene radicals derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reactant either in admixture or sequentially. Mixtures of such diols can be employed, if desired. A presently most preferred aliphatic diol of formula (I) is diethylene glycol. Additionally, amine-based aliphatic hydroxylated materials (i.e. hydroxylated amines) may be utilized, such as for example, monoethanolamine, diethanolamine, and triethanolamine.

Optionally, and for example, such a starting mixture can incorporate low molecular weight polyols (that is, compounds which preferably contain less than 7 carbon atoms per molecule but which contain at least three hydroxyl groups per molecule) in an amount generally ranging from greater than 0 up to 100 percent of the total hydroxylated material. Presently preferred such polyols comprise glycerol, 1,1,1-trimethylolpropane, 1,1,1-trimethylolethane, 2,2-dimethyl-1,3-propane diol, pentaerythritol, mixtures thereof, and the like.

In a preferred embodiment, the hydroxylated material in the polyester polyol is from about 30–65% by weight, based on the total weight of the polyester polyol. In a somewhat more preferred embodiment, the hydroxylated material in the polyester polyol is from about 40–60% by weight, based on the total weight of the polyester polyol.

C. Hydrophobic Material

The term "hydrophobic material" as used herein means a compound or mixture of compounds which contains one or more substantially non-polar organic moieties. The hydrophobic materials are substantially water insoluble and generally contain at least one group capable of being esterified or transesterified, such as a carboxylic acid group, a carboxylic acid ester group, or a hydroxyl group. Generally, the hydrophobic materials used herein are non-phthalic acid derived materials.

Any hydrophobic compound as above characterized can be employed, such as carboxylic acids (especially fatty acids), lower alkanol esters of carboxylic acids (especially fatty acid methyl esters), fatty acid alkanolamides, triglycerides (especially fats and oils), alkyl alcohols (for example, those containing from 4 to 18 carbon atoms per molecule), and the like. Mixtures of different hydrophobic compounds can be employed if desired.

Examples of fatty acids include caproic, caprylic, capric, lauric, myristic, palmitic, stearic, oleic, linoleic, linolenic, ricinoleic, and mixtures thereof. Other suitable acids include dimer acid and 2-ethylhexanoic acid.

Examples of fatty acid methyl esters include methyl caproate, methyl caprylate, methyl caprate, methyl laurate, methyl myristate, methyl palmitate, methyl oleate, methyl stearate, methyl linoleate, methyl linolenate, and mixtures thereof.

Examples of fatty alkanolamides include tall oil fatty acid diethanolamide, lauric acid diethanolamide, and oleic acid monoethanolamide.

Examples of alkyl alcohols include decyl, oleyl, cetyl, isodecyl, tridecyl, lauryl, mixed $C_{12}$–$C_{14}$, and mixtures thereof.

Examples of commercially available, relatively low cost fats and oils include castor, coconut (including cochin), corn, cottonseed, linseed, olive, palm, palm kernel, peanut, soybean, sunflower, and tall oils, tallow, and mixtures thereof.

Presently preferred types of hydrophobic materials include alkyl alcohols, lower alkylesters of fatty acids, fats, and oils. Examples of particular presently preferred such hydrophobic materials include decyl alcohol and soybean oil.

In a preferred embodiment, the hydrophobic material in the polyester polyol is from about 1–50% by weight, based on the total weight of the polyester polyol. In a somewhat more preferred embodiment, the hydrophobic material in the polyester polyol is from about 5–35% by weight, based on the total weight of the polyester polyol.

Alternative Polyester Polyol: Pre-Formed Polyester Polyols

The polyester polyols s of the present invention are preferably prepared directly from reactants which include a phthalic acid based material, a hydroxylated material, and a hydrophobic material. However, although somewhat less preferably, the polyester polyols may be prepared from a polyol which is the reaction product of a phthalic acid based material and a hydroxylated material; i.e. a pre-formed polyester polyol. The pre-formed polyester polyol is then reacted, i.e. inter-esterified, with the hydrophobic material to make the final polyester polyol. Examples of suitable pre-formed polyols for this process are those derived from PET scrap and available under the designation Terol from Oxid. Examples of suitable DMT-derived polyester polyols are Terate®202, 203, 204, 2541, and 254A polyols, which are available from Cape Industries. Suitable phthalic anhydride-derived pre-formed polyester polyols are commercially available under the designation Pluracol®polyol 9118 from BASF Corporation, and STEPANPOL PS-2002, PS-2402, and PS-3152 from Stepan Company. Preferably the pre-formed polyester polyols used herein are not previously compatibilized for use with a blowing agent.

The pre-formed polyester polyol may also be a polyester amide, such as a polyester amide which is obtained by forming a polyester polyol in the presence of an amine or amino alcohol. Thus, polyester amides may be obtained by condensing an amino alcohol such as ethanolamine with the polycarboxylic acids set forth above or they may be made using substantially the same components that make up the pre-formed polyester polyol with only a portion of the components being an amine or amino alcohol.

Optional Polyols

Other types of polyols may be used in combination with the aromatic polyester polyol. Examples of polyols are thioether polyols, polyester amides and polyacetals containing hydroxyl groups, aliphatic polycarbonates containing hydroxyl groups, amine terminated polyoxyalkylene polyethers, and preferably, polyester polyols, polyester polyether polyols, polyoxyalkylene polyether polyols, and graft dispersion polyols. Mixtures of at least two of the aforesaid polyols can be used as long as the combination has an average hydroxyl number in the aforesaid range.

Polyoxyalkylene polyether polyols, which can be obtained by known methods, can be mixed with the polyol having ester linkages. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens, or by cationic polymerization with Lewis acids such as antimony pentachloride, boron trifluoride etherate, etc., or bleaching earth as catalysts, from one or more alkylene oxides with preferably 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups.

Included among the polyether polyols are polyoxyethylene glycol, polyoxypropylene glycol, polyoxybutylene glycol, and polytetramethylene glycol; block copolymers, for example, combinations of polyoxypropylene and polyoxyethylene glycols, poly-1,2-oxybutylene and polyoxyethylene glycols, poly-1,4-tetramethylene and polyoxyethylene glycols; and copolymer glycols prepared from blends or sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylol-propane, 1,1,1-trimethylolethane, pentaerythritol, 1,2,6-hexanetriol, alphamethyl glucoside, sucrose, and sorbitol. Also included within the term "polyhydric alcohol" are compounds derived from phenol such as 2,2-bis(4-hydroxyphenyl)-propane, commonly known as Bisphenol A.

Nonionic Surfactant

By the term "nonionic surfactant" as used herein is meant a compound which contains one or more hydrophobic moieties and one or more hydrophilic moieties and which has no moieties which dissociate in aqueous solution or dispersion into cations and anions.

While nearly any nonionic surfactant compound can be employed, in general, in the practice of the present invention, it is preferred that the nonionic surfactant be a polyoxyalkylene surfactant which contains an average of from about 4 to about 240 individual oxyalkylene groups per molecule with the oxyalkylene groups typically being selected from the group consisting of oxyethylene and oxypropylene.

Polyoxyalkylene nonionic surfactants may be based on any starting material which bears groups with hydrogen atoms reactive to alkoxylation. This includes hydroxyl, carboxyl, thiol, and primary and secondary amine groups. The surfactants may be based on materials with three or more alkoxylation-active functional groups, as well as the more commonly used mono- and di-functional starting materials. Thus, the product formed from glycerol, reacted with propylene oxide to form three discrete polyoxypropylene blocks, followed by reaction with ethylene oxide to add one polyoxyethylene block to each polyoxypropylene block, is a nonionic surfactant (in certain circumstances this nonionic surfactant may also function as a polyol), so long as it has polyoxypropylene blocks of sufficient size to function as the hydrophobic portion of the molecule. The fact that block polymers with more than two polyoxyalkylene chains can function as surfactants is illustrated by the Tetronic series of commercial surfactant products, described in *Polyethers, Part I: Polyalkylene Oxides and Other Polyethers*, N. G. Gaylord, ed., Interscience, 1963, pp. 233–7. Useful Tetronic surfactants generally have four polyoxyalkylene chains and exhibit the surface activity typical of materials used as surfactants. It is also notable that propoxylation to an average level of only two propylene oxide units per chain, followed by ethoxylation, is sufficient to create a material which functions as a non-ionic surfactant.

The hydrophobic portion of a nonionic surfactant is preferably derived from at least one starting compound which is selected from the group consisting of:

(a) fatty alcohols containing from about 6 to 18 carbon atoms each, (b) fatty amides containing from about 6 to 18 carbon atoms each, (c) fatty amines containing from about 6 to 18 carbon atoms each, (d) fatty acids containing from 6 to 18 carbon atoms each, (e) phenols and/or alkyl phenols wherein the alkyl group contains from about 4 to 16 carbon atoms each, (f) fats and oils containing from 6 to about 60 carbon atoms each, and (g) polyoxypropylene glycols containing from 10 to 70 moles of propylene oxide, and (h) mixtures thereof.

In making a nonionic surfactant, such a starting compound is sufficiently alkoxylated to provide a desired hydrophilic portion. Depending on the alkoxylation reaction conditions typically used by one of ordinary skill in the art, the starting compound is alkoxylated on average with about 3 to 125 moles of alkylene oxide per mole of starting compound, where the alkoxylation material preferably being selected from the group consisting of ethylene oxide, propylene oxide, and mixtures thereof.

One class of nonionic surfactants employable in the practice of this invention is characterized by the formula (3):

$$RO(CH_2CH_2O)_nH \qquad (3)$$

where:

R is radical selected from the group consisting of alkyl phenyl radicals wherein the alkyl group in each such radical contains about four to eighteen carbon atoms, and alkyl radicals each containing from six through twenty carbon atoms, and n is a positive whole number which is sufficient to keep the molecular weight of the product surfactant below about 1500.

It is presently preferred that nonionic surfactants employable in the practice of the present invention be characterized by containing block units of ethylene oxide in combination with block units of propylene oxide or butylene oxide. Thus the hydrophobic part of a molecule may contain recurring butylene oxide or propylene oxide units or mixed units of butylene oxide and propylene oxide. Minor amounts of ethylene oxide may also be present within the blocks of propylene oxide or butylene oxide. Thus, the hydrophobic portion may consist of a polyoxyalkylene block derived from alkylene oxides with at least three carbon atoms, an alkyl, aryl, or alkaryl hydrocarbon group with at least six carbon atoms, as for instance from a fatty alcohol, or a combination of one or more such polyoxyalkylene blocks and one or more such hydrocarbon groups. Typically, the hydrophilic portion of the nonionic surfactants employed herein is comprised of ethylene oxide units.

One preferred class of nonionic surfactants contains at least one block polyoxypropylene group containing at least about 5 propoxy units and also at least one block polyoxyethylene group containing at least about 5 ethoxy units.

One particularly preferred class of nonionic surfactant is characterized by having:

(1) a molecular weight of at least from about 3000 to 6000, (2) at least one block polyoxypropylene group which contains from about 10 to 70 repeating propoxy units, (3) at least one block polyoxyethylene group which contains from about 10 to 100 repeating ethoxy units, and (4) both a hydrophobic moiety and a hydrophilic moiety.

In such a nonionic surfactant as above characterized, the total alkoxyl content must include at least 10 weight percent of ethylene oxide, and preferably the ethylene oxide content ranges from about 20 to 60 weight percent, and most preferably the ethylene oxide content ranges from about 30 to 40 weight percent. Preferably such a nonionic surfactant is end capped with at least one ethylene oxide group.

Typically, the amount of the nonionic surfactant, based on the combined weight of polyester polyol and nonionic surfactant, is generally from about 1–30% by weight, more preferably 4–26% by weight, and most preferably 6–20% by weight.

Additionally, the combined amount of the polyester polyol and nonionic surfactant, based on the total weight of polyester polyol, nonionic surfactant and blowing agent is generally from about 65–99% by weight.

Blowing Agent

The third ingredient, a blowing agent, is an aliphatic or cycloaliphatic $C_4$–$C_7$ hydrocarbon. This material has a boiling point of 70° C. or less at 1 atmosphere, preferably 50° C. or less. The hydrocarbon is physically active and has a sufficiently low boiling point to be gaseous at the exothermic temperatures caused by the reaction between the isocyanate and polyols, so as to foam the resulting polyurethane matrix. The hydrocarbon blowing agents consist exclusively of carbon and hydrogen; therefore, they are non-halogenated by definition. Examples of the $C_4$–$C_7$ hydrocarbon blowing agents include linear or branched alkanes, e.g. butane, isobutane, 2,3-dimethylbutane, n- and isopentane and technical-grade pentane mixtures, n- and isohexanes, and n- and isoheptane. Specific examples of alkenes are 1-pentene, 2-methylbutene, 3-methylbutene, and 1-hexene, and of cycloalkanes are cyclobutane, preferably cyclopentane, cyclohexane or mixtures thereof. Preferentially, cyclopentane, n- and isopentane, and mixtures thereof are employed.

Other blowing agents can be used in combination with the one or more $C_4$–$C_7$ hydrocarbon blowing agents; these may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate a gas, such as $CO_2$. Suitable chemically active blowing agents include, but are not limited to, water, mono- and polycarboxylic acids having a molecular weight of from 46 to 300, salts of these acids, and tertiary alcohols.

Water may be used as a co-blowing agent with the hydrocarbon blowing agent. Water reacts with the organic isocyanate to liberate $CO_2$ gas which is the actual blowing agent. However, since water consumes isocyanate groups, an equivalent molar excess of isocyanate must be provided to make up for the consumed isocyanates.

The organic carboxylic acids used as the chemically active blowing agents are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate addition or are reactive with isocyanate, and/or may contain olefinically unsaturated groups. Specific examples of chemically inert substituents are halogen atoms, such as fluorine and/or chlorine, and alkyl groups, e.g. methyl or ethyl. The substituted organic carboxylic acids preferably contain at least one further group which is reactive toward isocyanates, e.g. a mercapto group, a primary and/or secondary amino group, or a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercapto-propionic acid, glycolic acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The salts of carboxylic acids are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyester polyol resin blend.

Combinations of any of the aforementioned chemically active blowing agents may be employed, such as formic acid, salts of formic acid, and/or water.

Physically active blowing agents suitable for use in combination with the hydrocarbon blowing agents are those which boil at the foaming exotherm temperature or less, preferably at 50° C. or less at 1 atmosphere. The most preferred physically active blowing agents are those which have an ozone depletion potential of 0.05 or less. In addition to hydrocarbons, examples of other physically active blowing agents are dialkyl ethers, cycloalkylene ethers and ketones; hydrochlorofluorocarbons (HCFCs); hydrofluorocarbons (HFCs); perfluorinated hydrocarbons; fluorinated ethers; and decomposition products.

Any hydrochlorofluorocarbon blowing agent may be used in the present invention. Preferred hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-dichloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-152), trifluoromethane; heptafluoropropane; 1,1,1-trifluoroethane; 1,1,2-trifluoroethane; 1,1,1,2,2-pentafluoropropane; 1,1,1,3, 3-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, -hexane, -cyclohexane, -heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

The total and relative amounts of blowing agents will depend upon the desired foam density, the type of hydrocarbon, and the amount and type of additional blowing agents employed. Polyurethane foam densities typical for rigid polyurethane insulation applications range from free rise densities of 1.3 to 2.5 pounds per $ft^3$ (pcf), preferably from 1.3 to 2.1 pcf, and overall molded densities of 1.5 to 3.0 pcf. The amount by weight of all blowing agents in the resin blend is generally 5 php to 35 php, preferably 10 php to 30 php (php means parts per hundred parts of all polyols). Based on the weight of all the foaming ingredients (i.e., the resin blend and the isocyanate), the total amount of blowing agent is generally from 3 wt % to 15 wt %. The amount of hydrocarbon blowing agent, based on the weight of all the foaming ingredients, may also be from 3 wt. % to 15 wt %, preferably from 5 wt % to 10 wt %.

Generally, the amount of the hydrocarbon blowing agent based on the combined weight of the polyester polyol, nonionic surfactant and blowing agent may be from about 1–35% by weight.

Water is typically found in minor quantities in the polyols as a byproduct and may be sufficient to provide the desired blowing from a chemically active substance. Optionally, however, water may be additionally introduced into the polyol resin blend in amounts from 0.05 to 5 php, preferably from 0.25 to 1.0 php. The physically active blowing agents, if employed, makes up the remainder of the blowing agent for a total of from 5 php to 35 php based on the total resin blend, or 3 wt % to 15 wt. % based on the weight of all the foaming ingredients.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples which are not to be construed as limiting the invention in spirit or scope to the specific procedures or compositions described in them.

EXAMPLE A 3667 g. of phthalic anhydride, 5333 g. of diethylene glycol, and 4.5 g. of tetrabutyl titanate are combined in a 12-liter reaction flask and reacted at 210° C. to produce a polyol with hydroxyl number 332 and acid value 2.8. 1877 g. soybean oil is added, and the mixture is maintained at 200° for 4 hr. with stirring, to effect inter esterification. The resulting polyol ("Polyol A") has a hydroxyl value of 276 and an acid value of 3.3.

To 4840 g. of Polyol A is added 660 g. of a nonionic surfactant which is the reaction product of one mole of Neodol 45 (a linear $C_{14}$–$C_{15}$ alcohol), 14 moles of propylene oxide, and 11 moles of ethylene oxide. To form a resin blend for the production of polyurethane-modified polyisocyanurate foam, to 450 g. of the blend of Polyol A and nonionic surfactant there are added 67.5 g. of tris-(2-chloroisopropyl) phosphate (a flame retardant), 11.2 g of Goldschmidt B-84PI silicone surfactant, 16.0 g. of Dabco K-15 catalyst, 4.0 g. of N,N-dimethylethanolamine catalyst, and 112.5 g. of n-pentane.

A clear, low-viscosity resin blend is formed which is stable for at least 2 weeks.

EXAMPLE B 128.1 g. of the resin blend from Example A, and 171.9 g. of Mondur 489 polymeric isocyanate are combined at 25° C. and mixed for 6 sec. with a motor-driven mixing blade rotating at 2800 rpm. The mix shows a cream time of 8 sec. and a gel time of 31 sec. The resulting closed cell foam has a density, under free-rise conditions, of 1.71 pounds per cubic foot, and a compressive strength, parallel to the direction of rise, of 27 pounds per square inch.

EXAMPLE 1 (COMPARATIVE EXAMPLE)

5495 g. phthalic anhydride, 6904 g. diethylene glycol, and 6 g. tetrabutyl titanate are combined in a 12-liter reaction flask and reacted at 200–210° C., with application of a nitrogen sparge to remove water of reaction. The resulting polyol has a hydroxyl number of 240 and an acid number of 0.8.

EXAMPLE 2 (COMPARATIVE EXAMPLE)

5355 g. phthalic anhydride, 7044 g. diethylene glycol, and 6 g. tetrabutyl titanate are combined in a 12-liter reaction flask and reacted at 200–210° C., with application of vacuum to remove water of reaction. The resulting intermediate polyol has a hydroxyl number of 262 and an acid number of 1.0.

EXAMPLE 3

3667 g. phthalic anhydride, 5333 g. diethylene glycol, and 4.5 g. tetrabutyl titanate are combined in a 12-liter reaction flask and reacted at 200–210° C., with application of vacuum to remove water of reaction. The resulting intermediate polyol has a hydroxyl number of 332 and an acid number of 2.8. 1877 g. soybean oil is added, and the mixture is maintained at 200° for 4 hr. with stirring, to effect inter esterification. The resulting polyol has a hydroxyl number of 272 and an acid number of 3.1.

EXAMPLE 4 (COMPARATIVE EXAMPLE)

To 180 g. of the polyol of Example 2 is added 20 g. of a nonionic surfactant which is the reaction product of one mole of Neodol 45 (a linear $C_{14}$–$C_{15}$ alcohol), 14 moles of propylene oxide, and 11 moles of ethylene oxide. The final polyol blend has a hydroxyl number of 240.

EXAMPLE 5

To 180 g. of the polyol of Example 3 is added 20 g. of the nonionic surfactant of Example 4. The final polyol blend has a hydroxyl number of 249.

EXAMPLE 6 (COMPARATIVE EXAMPLE)

To 180 g. of the polyol of Example 2 is added 20 g. of a nonionic surfactant which is the reaction product of one mole of nonylphenol, 30 moles of propylene oxide, and 40 moles of ethylene oxide. The final polyol blend has a hydroxyl number of 238.

EXAMPLE 7

To 180 g. of the polyol of Example 3 is added 20 g. of the nonionic surfactant of Example 6. The final polyol blend has a hydroxyl number of 247.

EXAMPLE 8

A polyol blend is created by adding to 160 g. of the polyol of Example 3, 40 g. of Neodol 25-7, a nonionic surfactant produced by Shell Chemical Co. which is the reaction product of a $C_{12}$–$C_{15}$ fatty alcohol with 7 moles of ethylene oxide.

EXAMPLE 9

446.6 g. dimethyl terephthalate, 553.4 g. diethylene glycol, and 0.5 g. tetrabutyl titanate are combined in a 3-liter reaction flask and reacted at 200° C., with a nitrogen sparge to accelerate removal of methanol. When the evolution of methanol ceases, 200 g. soybean oil is added, and the mixture is maintained at 200° for 4 hr. with stirring, to effect inter esterification. The resulting polyol has a hydroxyl number of 267 and an acid number of 2.7. To 32 g. of this polyol is added 8 g. of Neodol 25-7 to obtain the final polyol blend.

EXAMPLE 10

2655 g. phthalic anhydride, 3043 g. diethylene glycol, 961 g. trimethylolpropane, and 3.4 g. tetrabutyl titanate are combined in a 12-liter reaction flask and reacted at 200–210° C., with application of a nitrogen sparge to remove water of reaction. The mixture is digested until the acid number drops to 3. 3178 g. soybean oil is added, and the mixture is maintained at 200° for 4 hr. with stirring, to effect inter esterification. The resulting polyol has a hydroxyl number of 148 and an acid number of 3.0. A polyol blend is created by adding to 36 g. of this polyol, 4 g. of Makon 6, a nonionic surfactant produced by Stepan Co. which is the reaction product of nonylphenol with 6 moles of ethylene oxide.

EXAMPLE 11

1061 g. phthalic anhydride, 1398 g. diethylene glycol, and 1.2 g. tetrabutyl titanate are combined in a 5-liter reaction flask and reacted at 200–210° C., with application of a nitrogen sparge to remove water of reaction. The mixture is digested until the acid number drops to 3. 540 g. Stepan C-68, a methyl ester of mixed $C_{16}$–$C_{18}$ fatty acids, is added, and the mixture is maintained at 200° with stirring until evolution of methanol is complete, to effect inter esterification. The resulting polyol has a hydroxyl number of 262 and an acid number of 3.3. A polyol blend is created by adding to 34 g. of this polyol 6 g. of the nonionic surfactant of Example 4.

EXAMPLE 12

A polyol blend is created by adding to 32 g. of the polyol of Example 3, 8 g. of Pluronic L-122, a nonionic surfactant which is a polyoxyethylene adduct of polyoxypropylene, produced by BASF Corporation.

EXAMPLE 13

A polyol blend is created by mixing 26.67 g. of the polyol of Example 3, 6.93 g. of the polyol of Example 2, and 6.4 g. of Polyglycol B70-4600, a nonionic surfactant produced by Dow Chemical Company which is a butylene oxide/ethylene oxide block copolymer.

EXAMPLE 14

A polyol blend is created by mixing 26.67 g. of the polyol of Example 3, 6.93 g. of the polyol of Example 2, and 6.4 g. of Toximul TA-15, a nonionic surfactant produced by Stepan Company which is the reaction product of tallowamine with 15 moles of ethylene oxide.

EXAMPLES 15–18

The polyols of Examples 2 and 3, and the nonionic surfactant of Example 4, are combined in various ratios to produce final polyol blends with differing amounts of nonionic surfactant and reacted soybean oil, as shown in Table 1.

EXAMPLE 19

A polyol blend is created by mixing 26.67 g. of the Polyol of Example 3, 6.93 g. of the polyol of Example 2, and 6.4 g. of a nonionic surfactant which is the reaction product of one mole of tallowamine with an average of 7 moles of ethylene oxide.

EXAMPLE 20 (COMPARATIVE EXAMPLE)

5185 g. phthalic anhydride, 6815 g. diethylene glycol, and 6 g. tetrabutyl titanate are combined in a 12-liter reaction flask and reacted at 200–210° C., with application of vacuum to remove water of reaction. The resulting intermediate polyol has a hydroxyl number of 289 and an acid number of 0.7. At room temperature, 72 g of this intermediate polyol, 12 g of soybean oil, and 16 g of a nonionic surfactant which is the reaction product of one mole of tallowamine with an average of 7 moles of ethylene oxide, are blended to make the final polyol.

The following definitions apply to the Examples and compositions in Tables 1–5.

Dabco DC-5098 is a silicone surfactant provided by Air Products and Chemicals, Inc.

Dabco K-15 catalyst is a solution of a potassium 2-ethylhexanoate provided by Air Products and Chemicals, Inc.

Polycat 5 catalyst is pentamethyldiethylenetriamine, provided by Air Products and Chemicals, Inc.

TABLE 1

| Example No. | 15* | 16 | 17* | 18 |
|---|---|---|---|---|
| Composition, percent by weight: | | | | |
| Polyol of Example 2 | 92.0 | 47.6 | 88.0 | 61.3 |
| Polyol of Example 3 | — | 44.4 | — | 26.7 |
| Nonionic Surfactant of Example 4 | 8.0 | 8.0 | 12.0 | 12.0 |
| | 100.0 | 100.0 | 100.0 | 100.0 |
| Content of Nonionic Surfactant (%) | 8 | 8 | 12 | 12 |
| Content of Reacted Soybean Oil (%) | 0 | 6 | 0 | 4.8 |

*Comparative Example

The polyol blends described in the above Examples 1–18 are combined with other ingredients to produce resin blends as indicated in Tables 2, 3, and 4. These blends include 25 to 30 parts of hydrocarbon blowing agent per 100 parts polyol blend, which is a typical amount effective in producing a final foam density in the desired 1.5 to 2.5 lb./cu. ft. range. Viscosities of the blends are measured with a Brookfield Viscometer. The blends are then observed at intervals for evidence of phase separation.

Resin blends C1, C4, and C7 in Table 2 illustrate the results with the unmodified diacid/glycol polyol. Blends C2, C5, and C8 represent prior art compositions taught in U.S. Pat. Nos. 5,464,562 and 5,470,501. Blends C3, C6, and C9 in Table 2 are examples of the invention.

Tables 3 and 4 provide additional examples of resin blends which illustrate the generality of the invention. The blends in Table 4 are representative of those that might be used in a process for which longer-term phase stability is not required, as for instance where the blowing agent is added only during the transfer of the resin preblend to the mixing head, or where a resin blend compounded in a separate chamber will be used quickly.

Table 5 presents a comparison of the effects of reacting a hydrophobic material into a polyol via inter esterification according to the invention, as opposed to merely admixing it with the polyol.

In the following Tables 2–5, C1, C2, C4, C5, C7, C8, C17, C19, and C22 are examples.

TABLE 4

| Resin Blend | C17 | C18 | C19 | C20 |
|---|---|---|---|---|
| Composition (php) | | | | |
| Polyol Blend from Example 15 | 100.00 | — | — | — |
| Polyol Blend from Example 16 | — | 100.00 | — | — |
| Polyol Blend from Example 17 | — | — | 100.00 | — |
| Polyol Blend from Example 18 | — | — | — | 100.00 |
| tris-(2-chloroisopropyl) phosphate | 15.00 | 15.00 | 15.00 | 15.00 |
| Dabco DC-5098 silicone surfactant | 2.00 | 2.00 | 2.00 | 2.00 |
| Dabco K-15 catalyst | 2.50 | 2.50 | 2.50 | 2.50 |
| Polycat 5 catalyst | 0.25 | 0.25 | 0.25 | 0.25 |
| n-pentane | 30.00 | 30.00 | 30.00 | 30.00 |

TABLE 2

| Resin Blend | C1 | C2 | C3 | C4 | C5 | C6 | C7 | C8 | C9 |
|---|---|---|---|---|---|---|---|---|---|
| Composition (php) | | | | | | | | | |
| Polyol Blend from Example 1 | 100.00 | — | — | 100.00 | — | — | 100.00 | — | — |
| Polyol Blend from Example 4 | — | 100.00 | — | — | 100.00 | — | — | — | — |
| Polyol Blend from Example 5 | — | — | 100.00 | — | — | 100.00 | — | — | — |
| Polyol Blend from Example 6 | — | — | — | — | — | — | — | 100.00 | — |
| Polyol Blend from Example 7 | — | — | — | — | — | — | — | 100.00 | — |
| tris-(2-chloroisopropyl) phosphate | 15.00 | 15.00 | 15.00 | 15.00 | 15.00 | 15.00 | 15.00 | 15.00 | 15.00 |
| Dabco DC-5098 silicone surfactant | 2.00 | 2.00 | 2.00 | 2.00 | 2.00 | 2.00 | 2.00 | 2.00 | 2.00 |
| Dabco K-15 catalyst | 2.50 | 2.50 | 2.50 | 2.50 | 2.50 | 2.50 | 2.50 | 2.50 | 2.50 |
| Polycat 5 catalyst | 0.25 | 0.25 | 0.25 | 0.25 | 0.25 | 0.25 | 0.25 | 0.25 | 0.25 |
| n-pentane | 30.00 | 30.00 | 30.00 | — | — | — | — | — | — |
| Isopentane | — | — | — | 30.00 | 30.00 | 30.00 | — | — | — |
| cyclopentane | — | — | — | — | — | — | 30.00 | 30.00 | 30.00 |
| Resin Blend Appearance | Opaque | Opaque | Transparent, slightly hazy | Opaque | Opaque | Transparent, slightly hazy | Opaque | Opaque | Transparent, slightly hazy |
| Resin Blend Viscosity (centipoise, 20° C.) | 15,100 | 9,470 | 565 | 14,980 | 12,920 | 629 | 7,210 | 13,470 | 606 |
| Phase Stability, 1 day | Separates | Separates | Stable | Stable | Separates | Stable | Separates | Stable | Stable |
| Phase Stability, 1 week | Separates | Separates | Stable | Separates | Separates | Stable | Separates | Separates | Stable |

TABLE 3

| Resin Blend | C10 | C11 | C12 | C13 | C14 | C15 | C16 |
|---|---|---|---|---|---|---|---|
| Composition (php) | | | | | | | |
| Polyol Blend from Example 8 | 100.00 | — | — | — | — | — | — |
| Polyol Blend from Example 9 | — | 100.00 | — | — | — | — | — |
| Polyol Blend from Example 10 | — | — | 100.00 | — | — | — | — |
| Polyol Blend from Example 11 | — | — | — | 100.00 | — | — | — |
| Polyol Blend from Example 12 | — | — | — | — | 100.00 | — | — |
| Polyol Blend from Example 13 | — | — | — | — | — | 100.00 | — |
| Polyol Blend from Example 14 | — | — | — | — | — | — | 100.00 |
| tris-(2-chloroisopropyl) phosphate | 15.00 | 15.00 | 15.00 | — | 15.00 | 15.00 | 15.00 |
| Dabco DC-5098 silicone surfactant | 2.00 | 2.00 | 2.00 | 2.00 | 2.00 | 2.00 | 2.00 |
| Dabco K-15 catalyst | 2.50 | 2.50 | 2.50 | 5.00 | 2.50 | 2.50 | 2.50 |
| Polycat 5 catalyst | 0.25 | 0.25 | 0.25 | 0.25 | 0.25 | 0.25 | 0.25 |
| n-pentane | 30.00 | 30.00 | 30.00 | 30.00 | 25.00 | 30.00 | — |
| cyclopentane | — | — | — | — | — | — | 30.00 |
| Resin Blend Appearance | Clear | Clear | Clear | Clear | Clear | Clear | Clear |
| Resin Blend Viscosity (centipoise, 20° C.) | 222 | 112 | 200 | 1090 | 1090 | 1585 | 326 |
| Phase Stability, 1 day | Stable | Stable | Stable | Stable | Stable | Stable | Stable |
| Phase Stability, 1 week | Stable | Solid precipitate | Stable | Stable | Stable | Stable | Stable |

TABLE 4-continued

| Resin Blend | C17 | C18 | C19 | C20 |
|---|---|---|---|---|
| Resin Blend Appearance | Opaque | Opaque | Opaque | Opaque |
| Content of Nonionic Surfactant in polyol blend (%) | 8 | 8 | 12 | 12 |
| Content of Reacted Soybean Oil in polyol blend (%) | 0 | 6 | 0 | 4.8 |
| Resin Blend Viscosity (centipoise, 20° C.) | 5,500 | 985 | 7,050 | 1,850 |
| Phase Stability, 1 hour | Separates | Stable | Separates | Stable |

TABLE 5

| Resin blend | C21 | C22 |
|---|---|---|
| Polyol blend Example No. | 19 | 20 |
| % nonionic surfactant in polyol blend | 16 | 16 |
| % soybean oil in polyol blend | 12 | 12 |
| Mode of addition of soybean oil to polyol blend | Reacted, 200° C. | Admixed, room temperature |
| Appearance of polyol blend | Clear | Opaque |
| Resin blend composition (php): | | |
| Polyol blend from Example 19 | 100.00 | — |
| Polyol blend from Example 20 | — | 100.00 |
| tris-(2-chloroisopropyl) phosphate | 15.00 | 15.00 |
| Dabco DC-5098 silicone surfactant | 2.00 | 2.00 |
| Dabco K-15 catalyst | 2.50 | 2.50 |
| Polycat 5 catalyst | 0.25 | 0.25 |
| n-pentane | 30.00 | 30.00 |
| Appearance of resin blend | Slightly hazy, transparent | Opaque |
| Resin blend phase stability: 1 hour | Stable | Separates |
| 1 day | Stable | Separates |
| 1 week | Stable | Separates |

The invention and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

What is claimed is:

1. A polyester polyol based resin blend comprising:
   (a) an aromatic polyester polyol formed by an inter-esterification reaction between
      (i) a phthalic acid based material;
      (ii) a hydroxylated material having a functionality of at least 2; and
      (iii) less than about 40 percent by weight of a hydrophobic material having:
         (1) from one to six radicals, the radicals being selected from the group consisting of carboxylic acid groups, carboxylic acid ester groups, hydroxyl groups, and mixtures thereof;
         (2) hydrocarbon groups comprising a total of at least 4 carbon atoms for each radical present in the hydrophobic material; and
         (3) an average molecular weight of from about 100 to 1000; and
   (b) a nonionic surfactant; and
   (c) from 14 to about 35 parts per hundred parts of all polyols of a $C_4$–$C_7$ hydrocarbon blowing agent.

2. A blend according to claim 1, wherein the amount of phthalic acid residue relative to the amount of the hydroxylated material is selected such that the aromatic polyester polyol has a hydroxyl number of between 100 and 600.

3. A blend according to claim 1, wherein the amount of hydrophobic material in the aromatic polyester polyol is from about 1 to less than about 35% by weight, based on the total weight of the aromatic polyester polyol.

4. A blend according to claim 1, wherein the amount of the aromatic polyester polyol (a), based on the combined weight of the aromatic polyester polyol (a) and the nonionic surfactant (b), is from about 70–99% by weight.

5. A blend according to claim 1, wherein the amount of the nonionic surfactant (b), based on the combined weight of the aromatic polyester polyol (a) and the nonionic surfactant (b), is from about 1–30% by weight.

6. A blend according to claim 1, wherein the combined amount of the aromatic polyester polyol (a) and the nonionic surfactant (b), based on the total weight of components (a), (b), and (c), is from about 65–86% by weight.

7. A blend according to claim 2, wherein the combined amount of the aromatic polyester polyol (a) and the nonionic surfactant (b), based on the total weight of, components (a), (b), and (c), is from about 65–86% by weight; and the hydroxylated material is selected from the group consisting of ethylene glycol, diethylene glycol, propylene glycol, dipropylene glycol, trimethylene glycol, butylene glycols, 1,2-cyclohexanediol, poly(oxyalkylene)polyols derived by the condensation of ethylene oxide, propylene oxide, or any combination thereof, glycerol, 1,1,1-trimethylolpropane, 1,1,1-trimethylolethane, 2,2-dimethyl-1,3-propane diol, pentaerythritol, and mixtures thereof.

8. A blend according to claim 7, wherein the hydrophobic material is selected from the group consisting of castor oil, coconut oil, corn oil, cottonseed oil, linseed oil, olive oil, palm oil, palm kernel oil, peanut oil, soybean oil, sunflower oil, tall oil, tallow, and mixtures thereof.

9. A blend according to claim 8, wherein the phthalic acid based material is phthalic anhydride and the hydroxylated material is diethylene glycol.

10. A blend according to claim 8, wherein the phthalic acid based material is phthalic anhydride and the hydroxylated material is triethylene glycol.

11. A blend according to claim 9, wherein the hydrocarbon blowing agent is a pentane.

12. A blend according to claim 10, wherein the hydrocarbon blowing agent is a pentane.

13. A polyurethane or polyisocyanurate foam formed by the reaction of a polyisocyanate with the blend of claim 1.

14. A method for preparing a rigid closed cell polyisocyanate-based foam, comprising reacting an organic aromatic polyisocyanate and a polyol in the presence of a nonionic surfactant and from 14 to about 35 parts per hundred parts of all polyols of a $C_4$–$C_7$ aliphatic or cycloaliphatic hydrocarbon blowing agent, where the polyol resin blend comprises an aromatic polyester polyol formed by an inter-esterification reaction between (i) a phthalic acid based material; (ii) a hydroxylated material having a functionality of at least 2; and (iii) less than 40% by weight of a hydrophobic material having
   (1) from one to six radicals, the radicals being selected from the group consisting of carboxylic acid groups, carboxylic acid ester groups, hydroxyl groups, and mixtures thereof; and
   (2) hydrocarbon groups comprising a total of at least 4 carbon atoms for each radical present in the hydrophobic material; and
   (3) an average molecular weight of from about 100 to 1000.

* * * * *